(12) United States Patent
Guidry

(10) Patent No.: US 7,246,844 B2
(45) Date of Patent: Jul. 24, 2007

(54) FOLDING TOY HAULER TENT TRAILER

(75) Inventor: Michael Roman Guidry, Redondo Beach, CA (US)

(73) Assignee: Yamaha Motor Co., Ltd. (JP)

( * ) Notice: Subject to any disclaimer, the term of this patent is extended or adjusted under 35 U.S.C. 154(b) by 64 days.

(21) Appl. No.: 11/177,726

(22) Filed: Jul. 8, 2005

(65) Prior Publication Data

US 2006/0033358 A1 Feb. 16, 2006

Related U.S. Application Data

(60) Provisional application No. 60/599,845, filed on Aug. 6, 2004.

(51) Int. Cl.
*B60P 3/355* (2006.01)
(52) U.S. Cl. .................................... 296/173
(58) Field of Classification Search ............... 296/173, 296/156, 158, 168, 172, 176
See application file for complete search history.

(56) References Cited

U.S. PATENT DOCUMENTS

| | | | |
|---|---|---|---|
| D155,902 S | 11/1949 | Keating | |
| D208,695 S | 9/1967 | Bouchard | |
| D211,167 S | 5/1968 | Smith et al. | |
| 3,613,920 A * | 10/1971 | Flamm | 414/537 |
| 3,658,359 A | 4/1972 | Claflin et al. | |
| 3,675,833 A | 7/1972 | Barr | |
| 3,757,972 A * | 9/1973 | Martin | 414/537 |
| 3,773,195 A | 11/1973 | Honea | |
| 3,809,348 A | 5/1974 | Di Laura | |
| 3,866,772 A | 2/1975 | Gardner | |
| 3,902,613 A * | 9/1975 | Newland | 414/538 |
| 3,905,527 A | 9/1975 | Chamberlain | |
| 3,917,086 A | 11/1975 | Sexton | |
| 3,923,335 A | 12/1975 | Erickson | |
| 3,924,764 A | 12/1975 | Youngblood, Jr. | |
| 4,073,461 A | 2/1978 | Lopez et al. | |
| 4,180,172 A | 12/1979 | Tomeback | |
| 4,188,056 A | 2/1980 | Watson | |
| 4,194,711 A | 3/1980 | Winton | |
| 4,368,455 A | 1/1983 | Menard | |
| 4,420,165 A | 12/1983 | Goodin | |
| 4,420,182 A | 12/1983 | Kaneshiro | |
| 4,598,925 A | 7/1986 | Riggin | |
| 4,641,843 A | 2/1987 | Morrisroe, Jr. | |
| 4,754,998 A | 7/1988 | LeJuerrne | |

(Continued)

FOREIGN PATENT DOCUMENTS

EP    0 274 788 A1    7/1988

(Continued)

*Primary Examiner*—H Gutman
(74) *Attorney, Agent, or Firm*—Knobbe Martens Olson & Bear LLP

(57) ABSTRACT

A trailer comprises a trailer body having a side portion. A trailer cover is coupled to the trailer body and is movable between a first position and a second position relative to the trailer body. The trailer cover in the first position is sufficiently rigid to support a recreational vehicle above the side portion of the trailer body. The trailer cover, when in the second position, forms at least a portion of a roof and is spaced from the trailer body a sufficient distance to at least partially define a habitation space below the trailer cover.

20 Claims, 16 Drawing Sheets

U.S. PATENT DOCUMENTS

| | | | |
|---|---|---|---|
| 4,768,824 A * | 9/1988 | Andonian | 296/165 |
| 4,874,284 A * | 10/1989 | New, Jr. | 414/537 |
| 4,967,942 A | 11/1990 | McGruder | |
| 5,009,457 A * | 4/1991 | Hall | 296/3 |
| 5,090,335 A | 2/1992 | Russell | |
| 5,348,149 A | 9/1994 | McCarthy | |
| 5,380,141 A * | 1/1995 | Flowers | 414/462 |
| 5,387,002 A | 2/1995 | Grevich | |
| 5,393,191 A * | 2/1995 | Alexander | 414/537 |
| 5,478,035 A | 12/1995 | Kneile | |
| 5,494,393 A * | 2/1996 | Schrunk | 414/537 |
| 5,495,911 A | 3/1996 | Mamonov | |
| 5,505,515 A | 4/1996 | Turner | |
| 5,567,003 A | 10/1996 | Gill | |
| 5,622,299 A * | 4/1997 | Berard | 224/403 |
| 5,730,455 A | 3/1998 | Varnum, Sr. et al. | |
| 5,823,283 A | 10/1998 | Mamonov | |
| 5,829,770 A | 11/1998 | Chiu | |
| 6,164,683 A | 12/2000 | Kalman | |
| 6,203,097 B1 | 3/2001 | Podgorney | |
| 6,371,719 B1 * | 4/2002 | Hildebrandt | 414/537 |
| 6,409,188 B1 | 6/2002 | Hesmer | |
| 6,722,726 B1 | 4/2004 | Parmer | |
| 6,739,617 B1 | 5/2004 | Martin | |
| 2003/0173758 A1 | 9/2003 | Badger et al. | |
| 2003/0184055 A1 | 10/2003 | Badger et al. | |
| 2005/0029829 A1 * | 2/2005 | Mack et al. | 296/26.05 |
| 2006/0158004 A1 * | 7/2006 | Harris et al. | 296/176 |

FOREIGN PATENT DOCUMENTS

| | | |
|---|---|---|
| EP | 0 426 589 A1 | 5/1991 |
| EP | 0 527 261 B1 | 2/1993 |
| EP | 0 581 658 A1 | 2/1994 |
| WO | WO 02/16165 A1 | 2/2002 |

\* cited by examiner

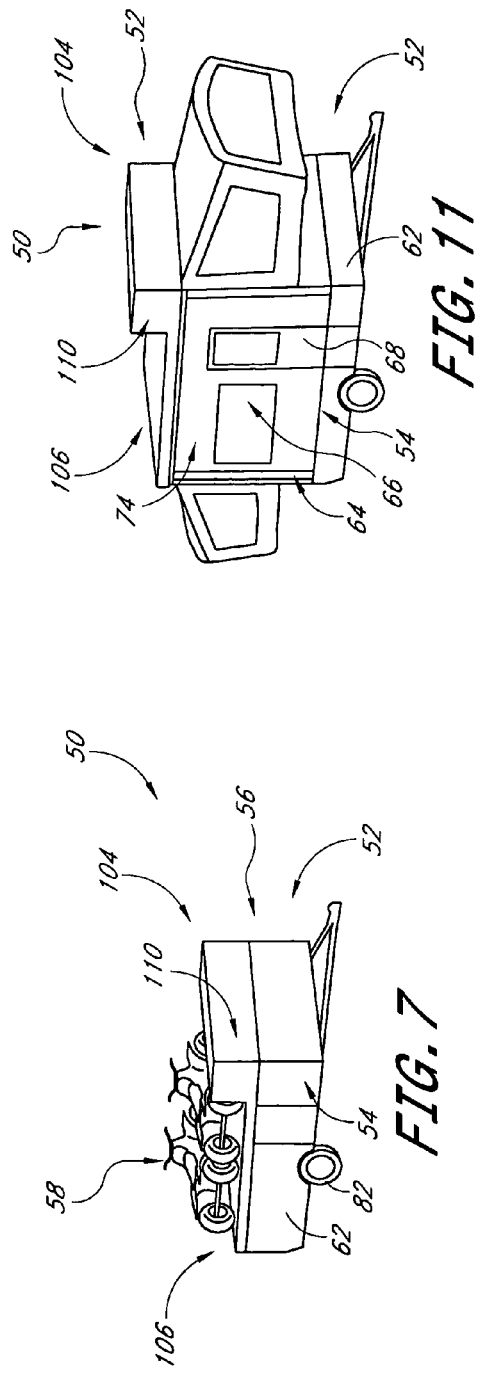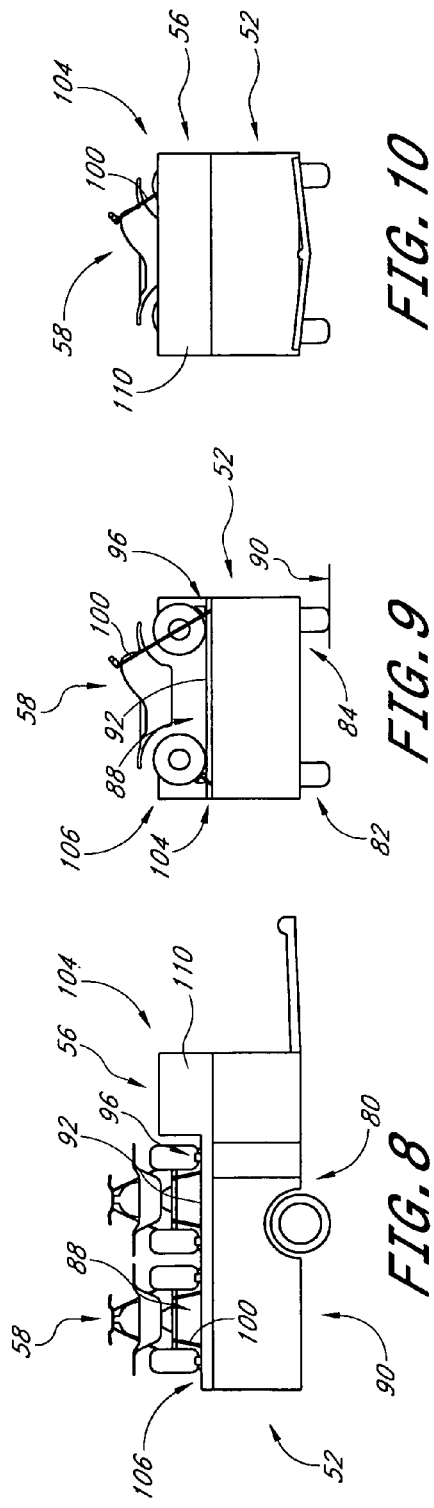

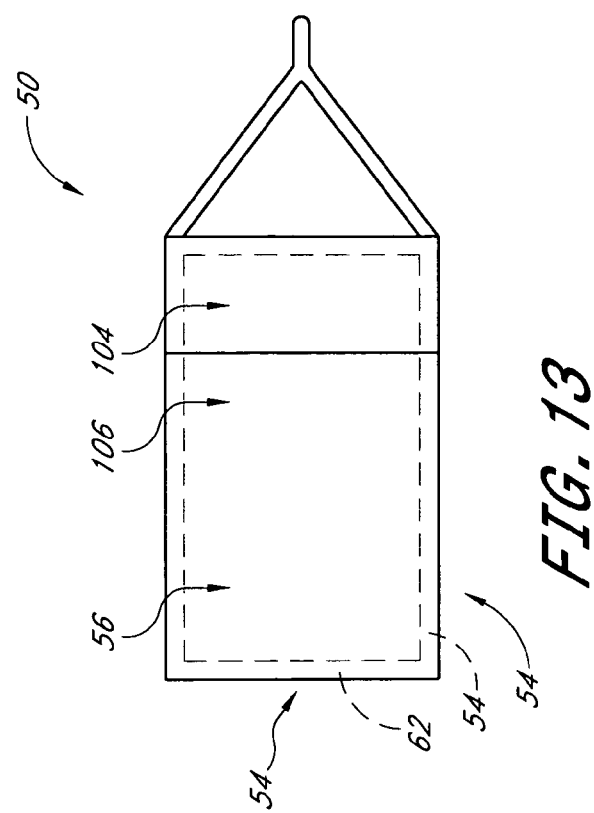
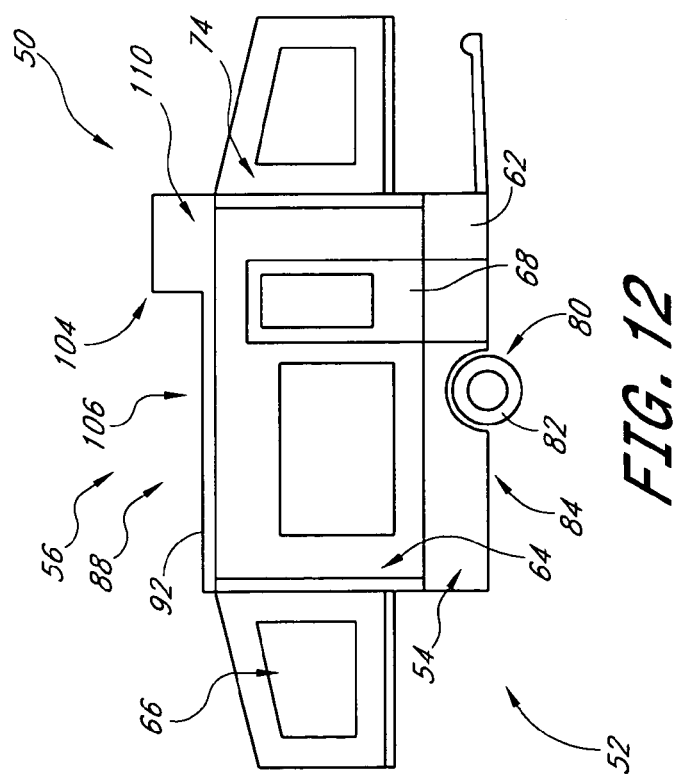
FIG. 13
FIG. 12

FOLDING TOY HAULER TENT TRAILER

RELATED APPLICATIONS

This application is based on and claims the priority of U.S. Provisional Patent Application No. 60/599,845, filed on Aug. 6, 2004, which is hereby expressly incorporated by reference herein in its entirety.

BACKGROUND OF THE INVENTION

1. Field of the Invention

The present application generally relates to trailers. More specifically, the present application relates to a folding tent trailer for hauling recreational vehicles.

2. Description of the Related Art

Folding trailers are small recreational vehicles that can be folded down for storage and travel and can be raised to provide a living space. The folding trailers are designed to be relatively low profile and towable by medium sized vehicles. They are typically lightweight and inexpensive with limited features.

Toy haulers are relatively large travel trailers that have been designed to carry off-road vehicles inside the rear cargo area of the trailer. When the vehicles are unloaded from the trailer, the area converts to a living space. Toy haulers typically have moderate to high-end amenities and are heavy duty. They usually have multiple axles and are often towed by bigger trucks or sport utility vehicles.

Traditional folding trailers are small enough to be stored within a typical garage, but are not adapted to carry recreational vehicles. Traditional folding trailers are too lightweight to carry large loads. Their tops are not reinforced and they typically have light-duty axles and chassis designs. Additionally, even if a recreational vehicle could be supported on top of a typical folding trailer, the combined height of the trailer and the vehicle would be too tall to fit within a garage.

Typical toy haulers are designed to carry off-road vehicles, but are generally too large to fit in a garage. Many people have difficulty storing the toy haulers; most store them in special facilities away from their homes. Additionally, the off-road vehicles are stored in the living area within the trailer. This negatively affects the comfort of the living area and limits the amenities provided. For example, oil and gas residue and odors tend to remain in the living area. Amenities in the cargo area are usually limited to temporary, removable habitation structures, such as for example, folding seats and beds.

SUMMARY OF THE INVENTION

The invention disclosed herein includes the realization that trailer systems can be improved to haul recreational vehicles and to provide a more comfortable living area or habitation space. In some embodiments, a platform supports a recreational vehicle above the trailer when the platform is in a lowered position, and the platform functions as a roof over a habitation space when in a raised position. It is further recognized that such a trailer system preferably is configured such that it fits within a garage with the recreational vehicle mounted thereon.

Thus, in accordance with another aspect of the invention disclosed herein, a trailer comprises a trailer body having a side portion. A trailer cover is coupled to the trailer body and is movable between a first position and a second position relative to the trailer body. The trailer cover in the first position is sufficiently rigid to support a recreational vehicle above the side portion of the trailer body. In the second position, the trailer cover forms at least a portion of a roof and is spaced from the trailer body a sufficient distance to at least partially define a habitation space below the trailer cover.

In another aspect, a trailer comprises a trailer body having a plurality of side walls and at least one wheel. The trailer comprises a platform for supporting a recreational vehicle. The platform has a lowered configuration and a raised configuration relative to the trailer body. The platform in the lowered configuration is at least partially supported on at least one of the side walls. The platform in the lowered configuration has a height, relative to a bottom of the wheel, of not greater than about three feet, four inches (101.6 cm). The platform in the raised configuration forms at least a portion of a roof and has a height, relative to the bottom of the wheel, sufficient to at least partially define a habitation space below the platform.

In another aspect, a trailer comprises a trailer body having a plurality of side walls and at least one wheel. The trailer comprises a platform for supporting a recreational vehicle. The platform has a lowered configuration and a raised configuration relative to the trailer body. The platform in the lowered configuration is at least partially supported on at least one of the side walls. The platform is so dimensioned that a distance from a bottom of the wheel to a top of a recreational vehicle, when loaded on the platform, is such that the trailer will fit within a garage with the recreational vehicle loaded thereon. The platform forms at least a portion of a roof in the raised configuration and is sufficiently spaced from the trailer body so as to at least partially define a habitation space below the platform.

In another aspect, a trailer comprises a trailer body having at least one powered habitation device. A trailer cover is coupled to the trailer body, and is movable between a first position and a second position relative to the trailer body. At least a portion of the trailer cover in the first position is sufficiently rigid to support a recreational vehicle. At least a portion of the trailer cover in the first position is disposed generally above the powered habitation device.

In another aspect, a trailer comprises a trailer body having one or more pieces of power equipment selected from the group consisting of a generator, a motor, a refrigerator, a stove, an oven, a water pump, an air compressor, a microwave oven, a television, a radio, a light, and a heater. A trailer cover is coupled to the trailer body, and is movable between a first position and a second position relative to the trailer body. At least a portion of the trailer cover in the first position is sufficiently rigid to support a recreational vehicle. At least a portion of the trailer cover in the first position is disposed generally above the one or more pieces of power equipment.

In another aspect, a method of using a trailer includes providing a trailer comprising a trailer body having a plurality of side walls and a trailer cover coupled to the trailer body. The trailer cover is positioned in a first position at least partially supported above the trailer body by at least one of the side walls. A recreational vehicle is supported on the trailer cover while in the first position. The trailer cover forming at least a portion of a roof is positioned in a second position defining a habitation space below the trailer cover in the second position.

In another aspect, a method of using a trailer includes providing a trailer comprising a trailer body having a plurality of side walls and a trailer cover coupled to the trailer body. The trailer cover is positionable in a first position for supporting a recreational vehicle and a second position forming at least a portion of a roof for at least partially defining a habitation space below the trailer cover in the second position. The trailer cover is placed in the first position at least partially supported above the trailer body by at least one of the side walls. A recreational vehicle is supported on the trailer cover while in the first position. The trailer is placed within a garage to support the recreational vehicle on the trailer cover in the garage.

In another aspect, a method of using a trailer includes providing a trailer comprising a trailer body having a plurality of side walls and a trailer cover coupled to the trailer body. The trailer cover is positionable in a first position for supporting a recreational vehicle and a second position forming at least a portion of a roof for at least partially defining a habitation space below the trailer cover in the second position. The trailer cover is placed in the first position at least partially supported above the trailer body by at least one of the side walls. A recreational vehicle is supported on the trailer cover while in the first position. The trailer is towed by a towing vehicle while supporting the recreational vehicle on the trailer cover.

In another aspect, a trailer comprises a trailer body having a plurality of side walls and at least one wheel. The trailer comprises a trailer cover for supporting one or more recreational vehicles. The trailer cover has a lowered configuration and a raised configuration relative to the trailer body. The trailer cover in the lowered configuration is at least partially slanted and supported on at least one of the side walls. The trailer cover in the lowered configuration has a lower portion with a height, relative to a bottom of the wheel, of not greater than about three feet, four inches. The trailer cover in the raised configuration forms at least a portion of a roof having a height, relative to the bottom of the wheel, sufficient to at least partially define a habitation space below the platform.

In another aspect, a method of using a trailer comprises, providing a trailer comprising a trailer body and a trailer cover coupled to the trailer body. The trailer cover is positioned in a first position for storage. The trailer cover is positioned in a second position for travel. The trailer cover is positioned in a third position for providing a habitation space.

BRIEF DESCRIPTION OF THE DRAWINGS

These and other features, aspects and advantages of the present invention will be better understood with reference to preferred embodiments, which are illustrated in the accompanying drawings. The illustrated embodiments are merely exemplary and are not intended to limit the scope of the present invention.

FIG. 7 is a perspective view of another preferred embodiment of a trailer, which has a trailer cover with a raised portion, with recreational vehicles mounted on the trailer.

FIG. 8 is a side elevational view of the trailer of FIG. 7.

FIG. 9 is a rear elevational view of the trailer of FIG. 7.

FIG. 10 is a front elevational view of the trailer of FIG. 7.

FIG. 11 is a perspective view of the trailer of FIG. 7, showing the trailer cover in a raised position with tent portions deployed.

FIG. 12 is a side elevational view of the trailer of FIG. 7, showing the trailer cover in a raised position.

FIG. 13 is a top plan view of the trailer of FIG. 7.

DETAILED DESCRIPTION OF THE PREFERRED EMBODIMENT

Figure 1:
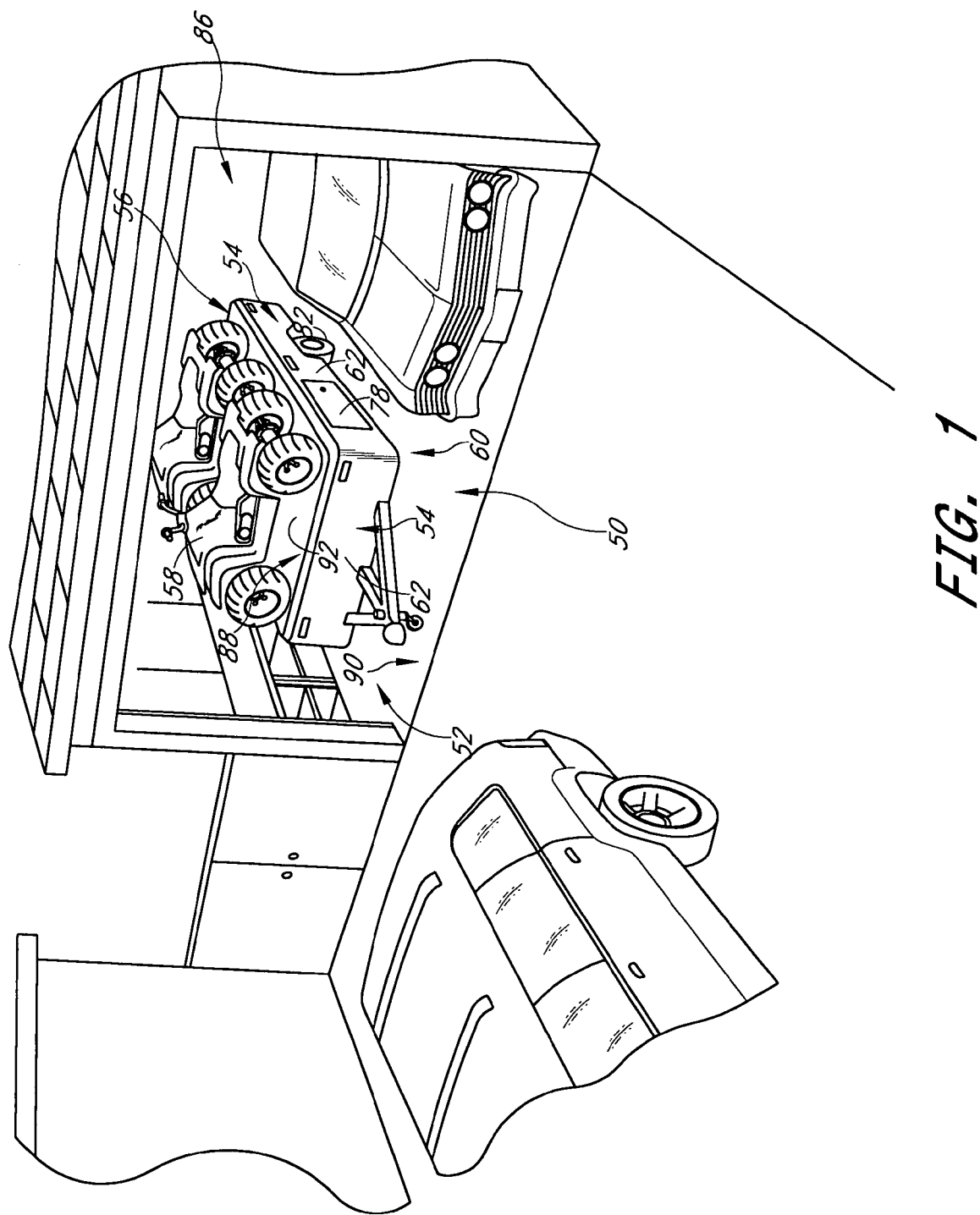
FIG. 1 is a perspective view of a preferred embodiment of the present invention, showing a folding tent trailer positioned within a garage with recreational vehicles mounted thereon.

With reference to FIG. 1, a trailer 50 having certain features, aspects and advantages of the present invention is described below. A folding toy hauler tent trailer represents an application for which many features, aspects and advantages of the present invention provide particular advantages. Nevertheless, certain features, aspects and advantages of the present invention can be used with other types of trailers.

Figure 2:
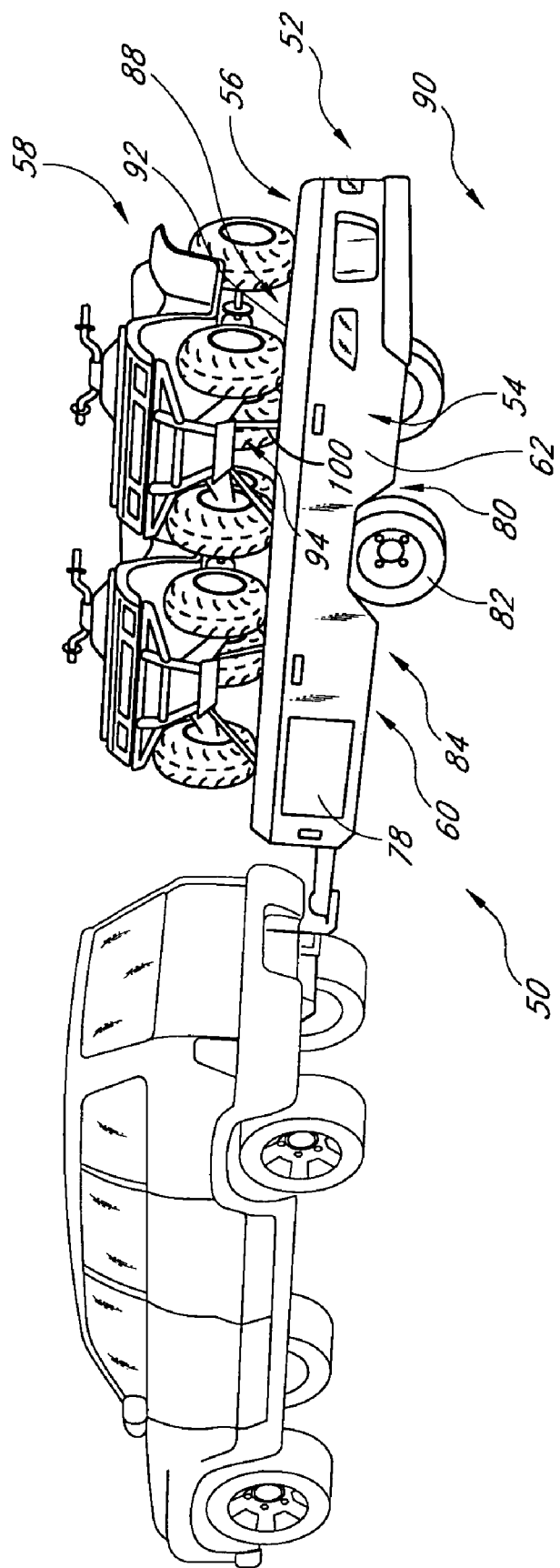
FIG. 2 is a perspective view of the trailer of FIG. 1, coupled with a towing vehicle.
Figure 3:
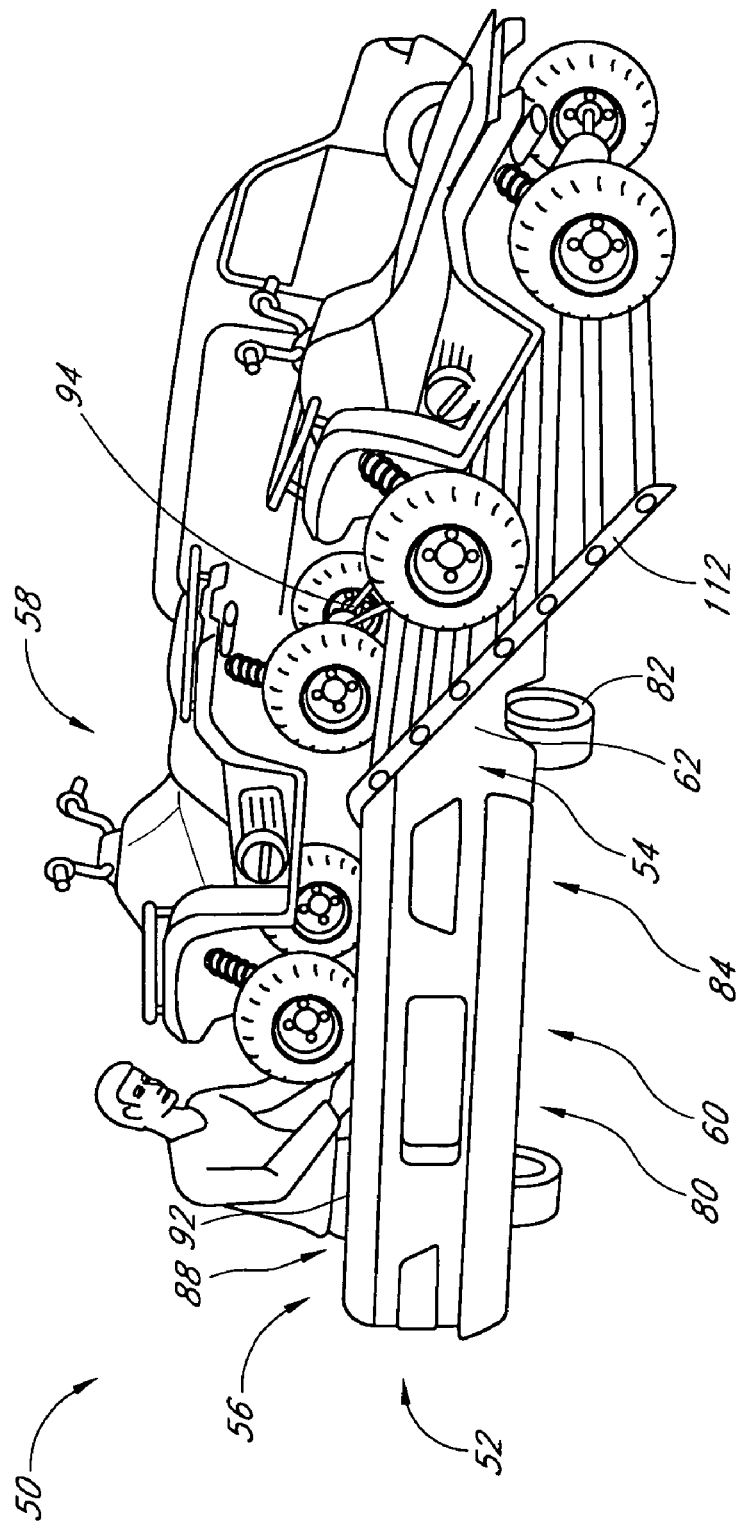
FIG. 3 is a perspective view of the trailer of FIG. 1, including a ramp for positioning the recreational vehicles atop the trailer.

As shown in FIGS. 1–6, in one preferred embodiment of the invention, a trailer 50 comprises a trailer body 52 having a side portion 54. A trailer cover 56 is coupled to the trailer body 52 and is movable between a first position relative to the trailer body 52, as shown, for example, in FIGS. 1–3, and a second position relative to the trailer body 52, as shown, for example, in FIG. 6. With reference to FIGS. 1–3, the trailer cover 56 in the first position is sufficiently rigid to support one or more recreational vehicles 58 above the side portion 54 of the trailer body 52. In the second position, the trailer cover 56 forms at least a portion of a roof and is spaced from the trailer body 52 a sufficient distance to at least partially define a habitation space 66 below the trailer cover 56, as shown, for example, in FIG. 6.

Figure 15:
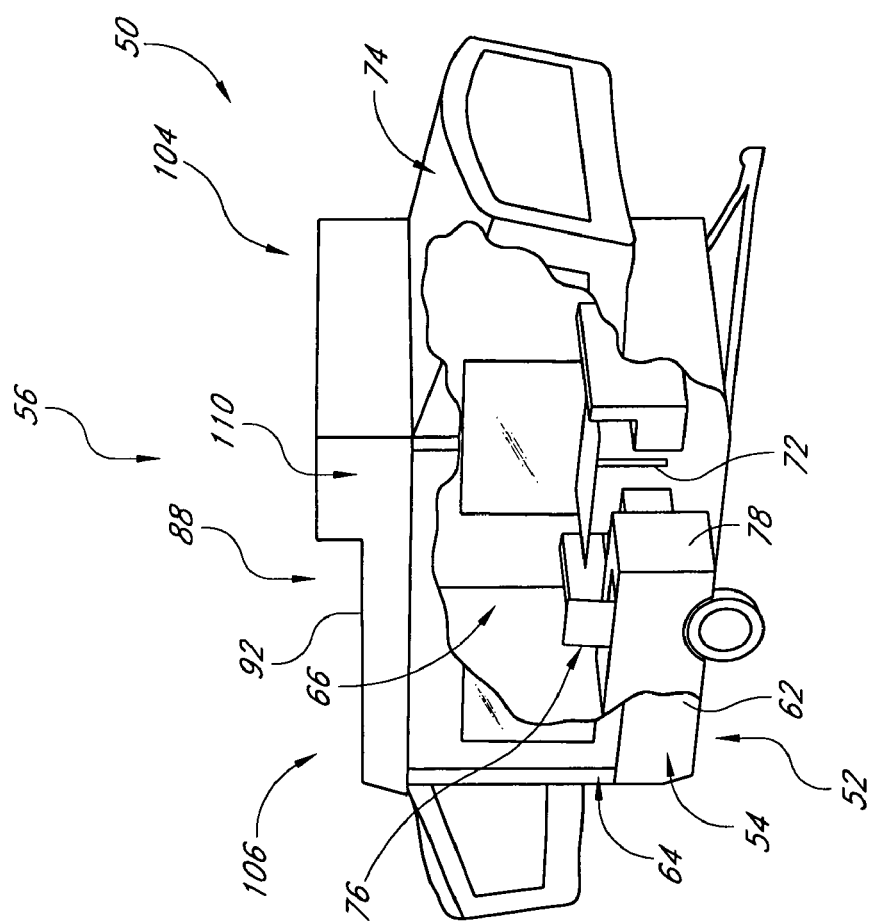
FIG. 15 is a perspective view of the trailer of FIG. 7, showing the trailer cover in a raised position with some portions partially broken away to show interior features of the trailer.
Figure 16:
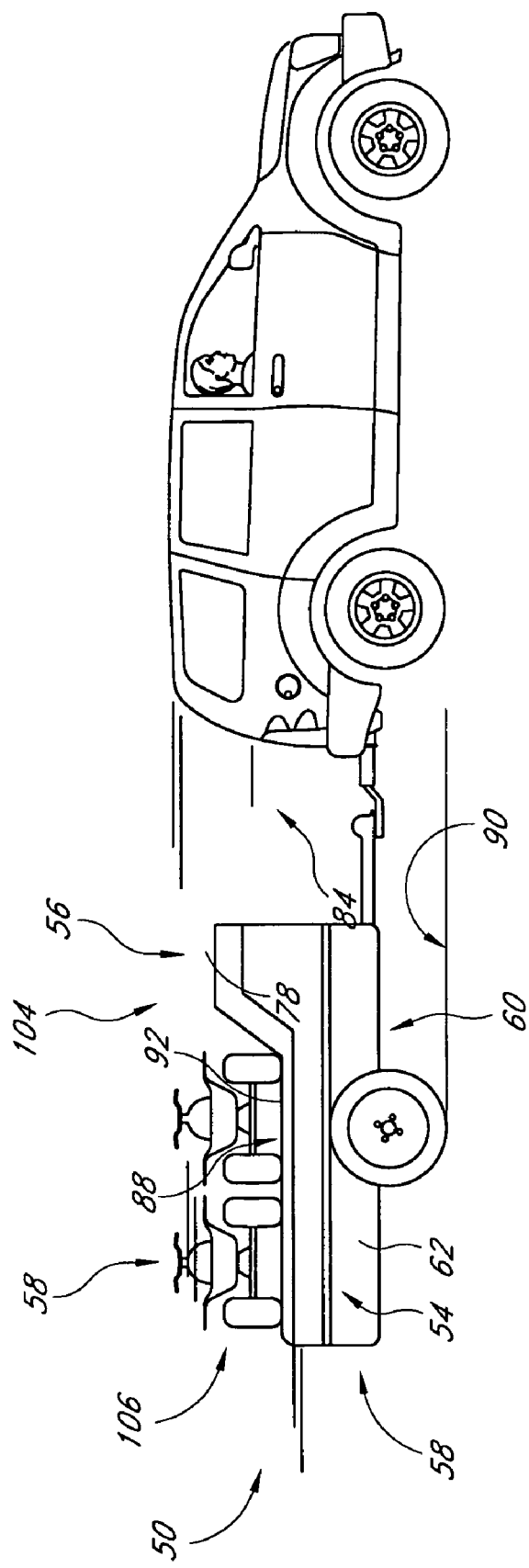
FIG. 16 is a perspective view of an additional preferred embodiment of a trailer, having a trailer cover with a raised portion, with recreational vehicles mounted thereon.
Figure 17:
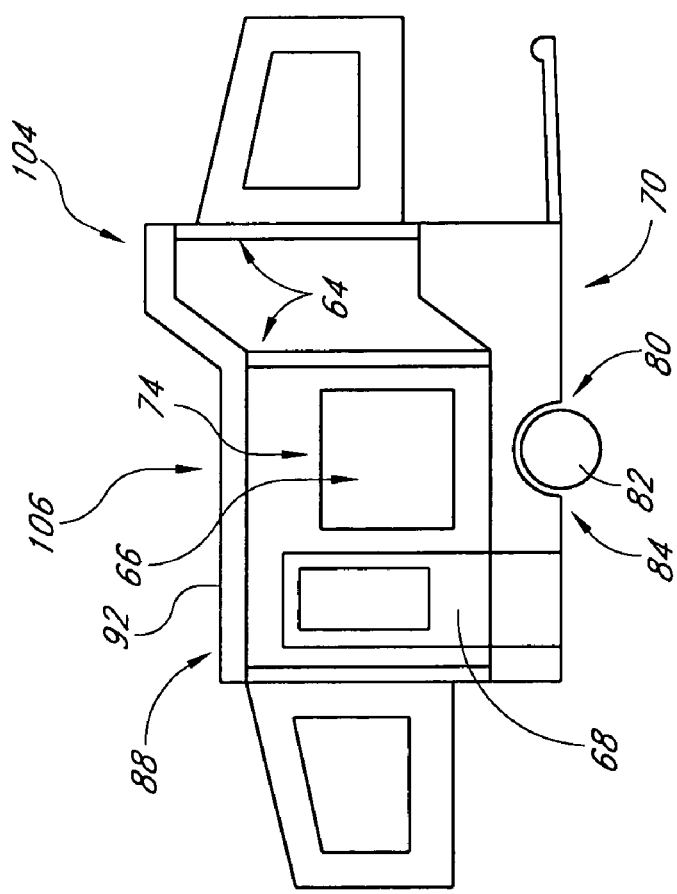
FIG. 17 is a side elevational view of the trailer of FIG. 16, showing the trailer cover in a raised position.
Figure 18:
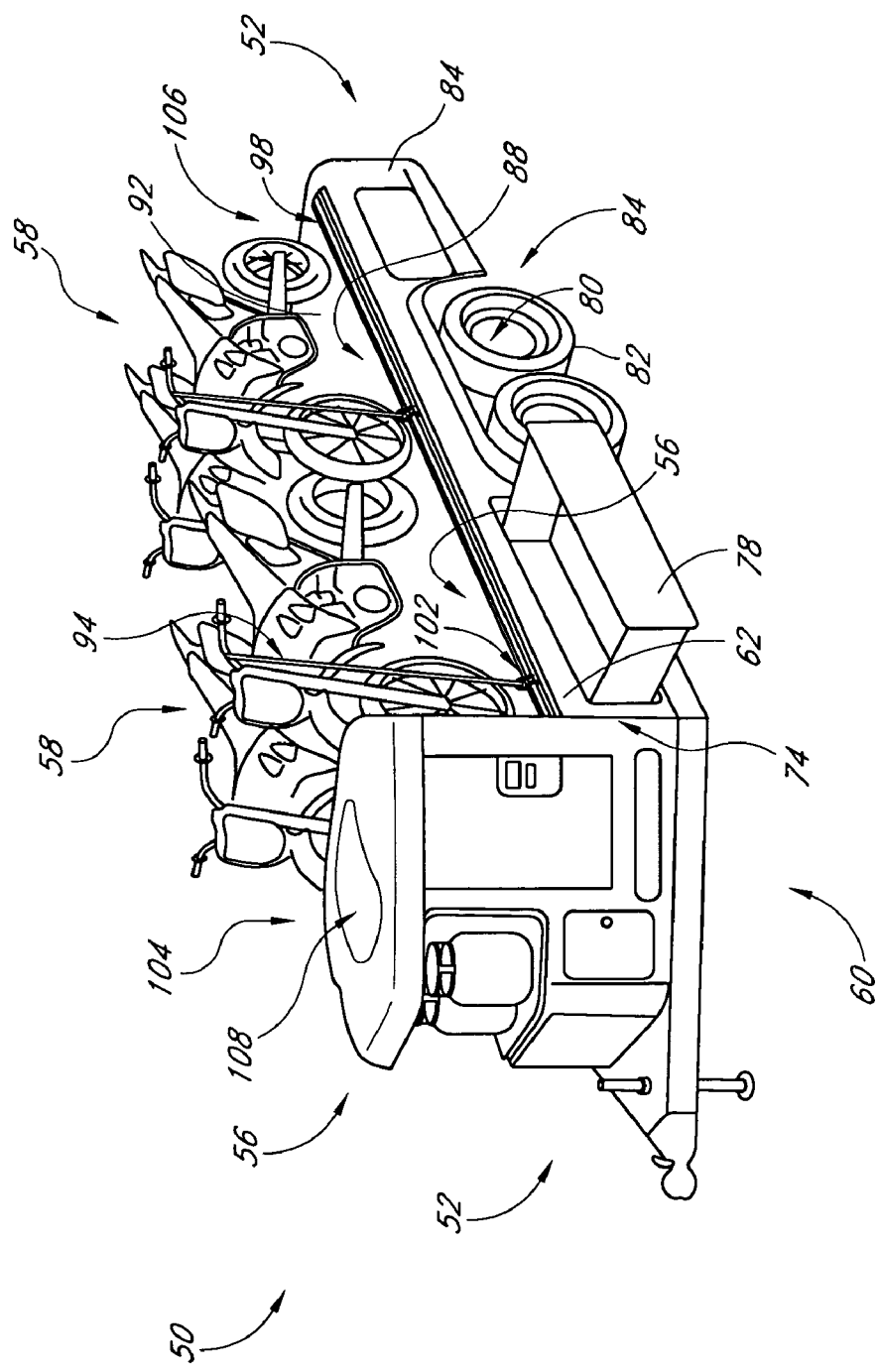
FIG. 18 is a perspective view of a further preferred embodiment of a trailer having a first trailer cover portion and a second trailer cover portion, showing recreational vehicles mounted on the second trailer cover portion.
Figure 19:
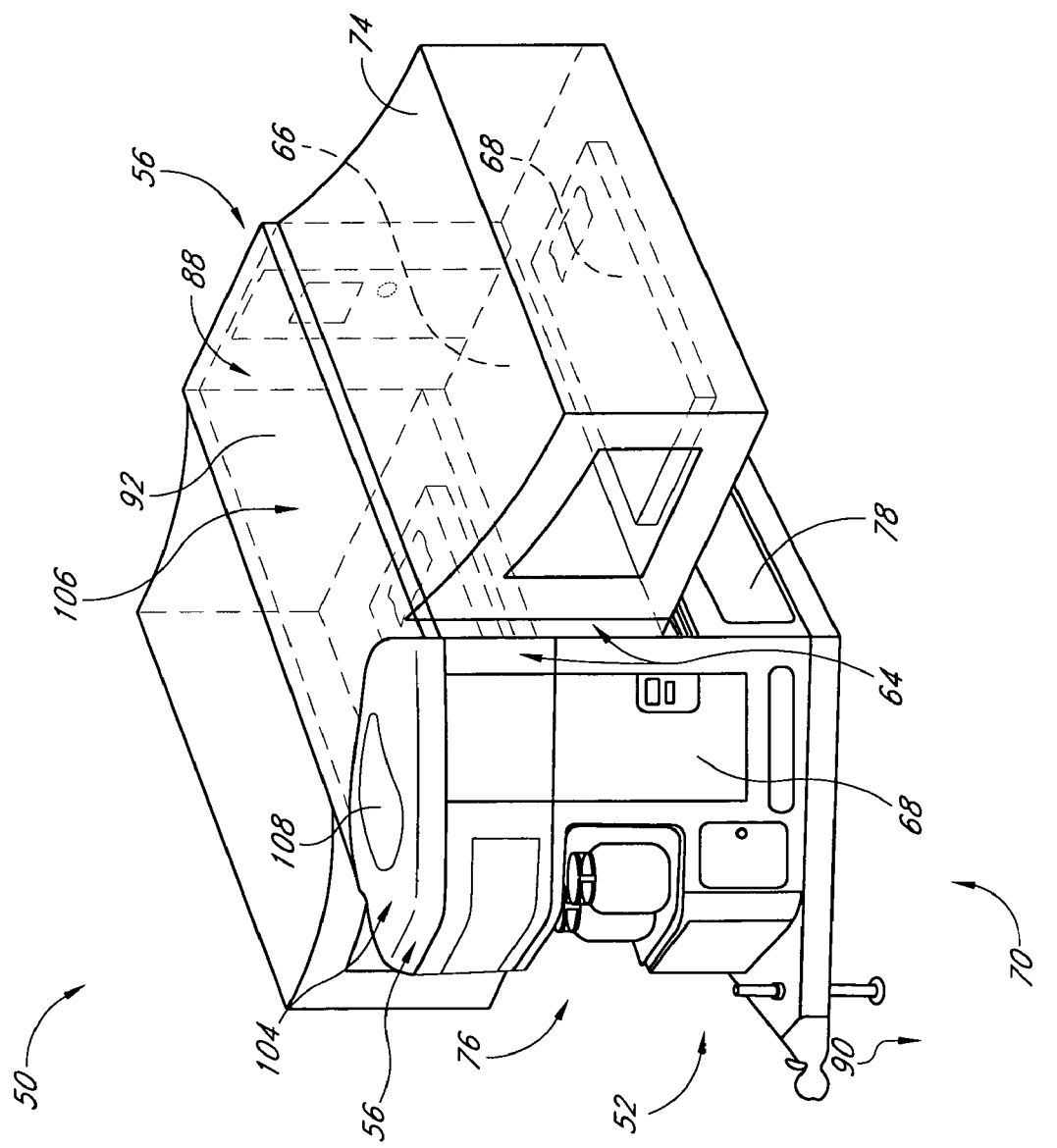
FIG. 19 is a perspective view of the trailer of FIG. 18, showing the first and second trailer cover portions in a raised configuration with tent portions deployed and some interior features shown in hidden lines.

With reference to FIGS. 7–15, another preferred embodiment of a trailer is illustrated having a trailer cover 56 with a first portion configured to be higher than a second portion. FIGS. 16–17 illustrate an additional preferred trailer embodiment having a trailer cover 56 with a first portion configured to be higher than a second portion. With reference to FIGS. 18–19 a trailer is illustrated having a trailer cover 56 with a first portion configured to be higher than a second portion at least in a lowered configuration, as will be described further below. FIGS. 20–23 illustrate other additional embodiments. Many of the structures, features, aspects and advantages that are described below with respect to one embodiment are also applicable to other embodiments shown or described herein. Accordingly, like reference numerals will be used to designate like structures throughout the different embodiments unless otherwise noted.

With continued reference to FIGS. 1–6, the trailer body 52 preferably has one or more side portions 54. The side portions 54 are coupled to a floor or base portion 60 to define a lower portion of the trailer 50. The side portions 54 comprise one or more side walls 62. The trailer cover 56 in the first position is preferably supported on at least one of the side walls 62 of the trailer body 52 or on one or more supports that extend from one of the side walls 62. As used herein, the term "side portions" includes the side walls, the front wall, the rear wall, the frame portions of the walls, any supports extending from any walls, and can also include portions of walls. The first position preferably is a lowered position wherein the trailer cover 56 is positioned near a top portion of the trailer body 52. In some embodiments, the trailer cover 56 preferably rests on, and is at least partially supported by, the side walls 62 of the trailer body 52. When the trailer cover is positioned above a side portion of the trailer body, the trailer cover is located generally above at least a portion of one or more of the front, rear, side, or other walls of the trailer body, but not necessarily above every portion of one or more of the walls. As shown in the illustrated embodiment, the trailer cover 56 is spaced from the base portion 60 of the trailer body 52, as will be described further below.

As described above, the trailer cover 56 in the first position preferably is sufficiently rigid to support one or more recreational vehicles 58. The terms "recreational vehicle" as used herein refer to relatively heavy vehicles, such as for example, but without limitation, motorcycles, ATV'S, personal watercraft, or other motorsports products or similar vehicles that would be too heavy to be supported atop a conventional folding tent trailer. The trailer cover 56 preferably comprises structural members spanning from one side of the trailer cover 56 to another to provide support for heavy loads. In some embodiments, structural members can extend from a left side of the trailer cover to the right side of the trailer cover, e.g., the structural members being generally parallel to one another. In some embodiments, structural members can extend from the front portion of the trailer cover to the rear portion of the trailer cover, e.g., the structural members being generally parallel to one another. In some embodiments, structural members can extend between side portions of the cover and between front and rear portions of the cover, e.g., the structural members can form a structural grid with some structural members being generally parallel to one another and some structural members being generally perpendicular to one another. The structural members can be, for example, rods, bars, struts, beams, and/or plates. In some embodiments plates can include diamond plate materials. Portions of the trailer cover 56 preferably are constructed with metal. Other materials or combinations of materials, including, for example, composite materials can be used in forming the trailer cover 56. The trailer cover 56 preferably comprises a reinforced support structure; however, the trailer cover 56 preferably is light enough to be raised using a lift mechanism 64 to a suitable height to provide a habitation space 66.

In some embodiments, the trailer cover 56 preferably comprises structural members configured such that the trailer cover supports a load greater than about 300 pounds (136.1 kg) in one or more positions. In some embodiments, the trailer cover 56 preferably supports a load greater than about 500 pounds (226.8 kg). In some embodiments, the trailer cover 56 preferably supports a load greater than about 700 pounds (317.5 kg). In some embodiments, the trailer cover 56 preferably supports a load greater than about 900 pounds (408.2 kg) or more. Still other embodiments are contemplated, e.g., including intermediate ranges.

Figure 4:
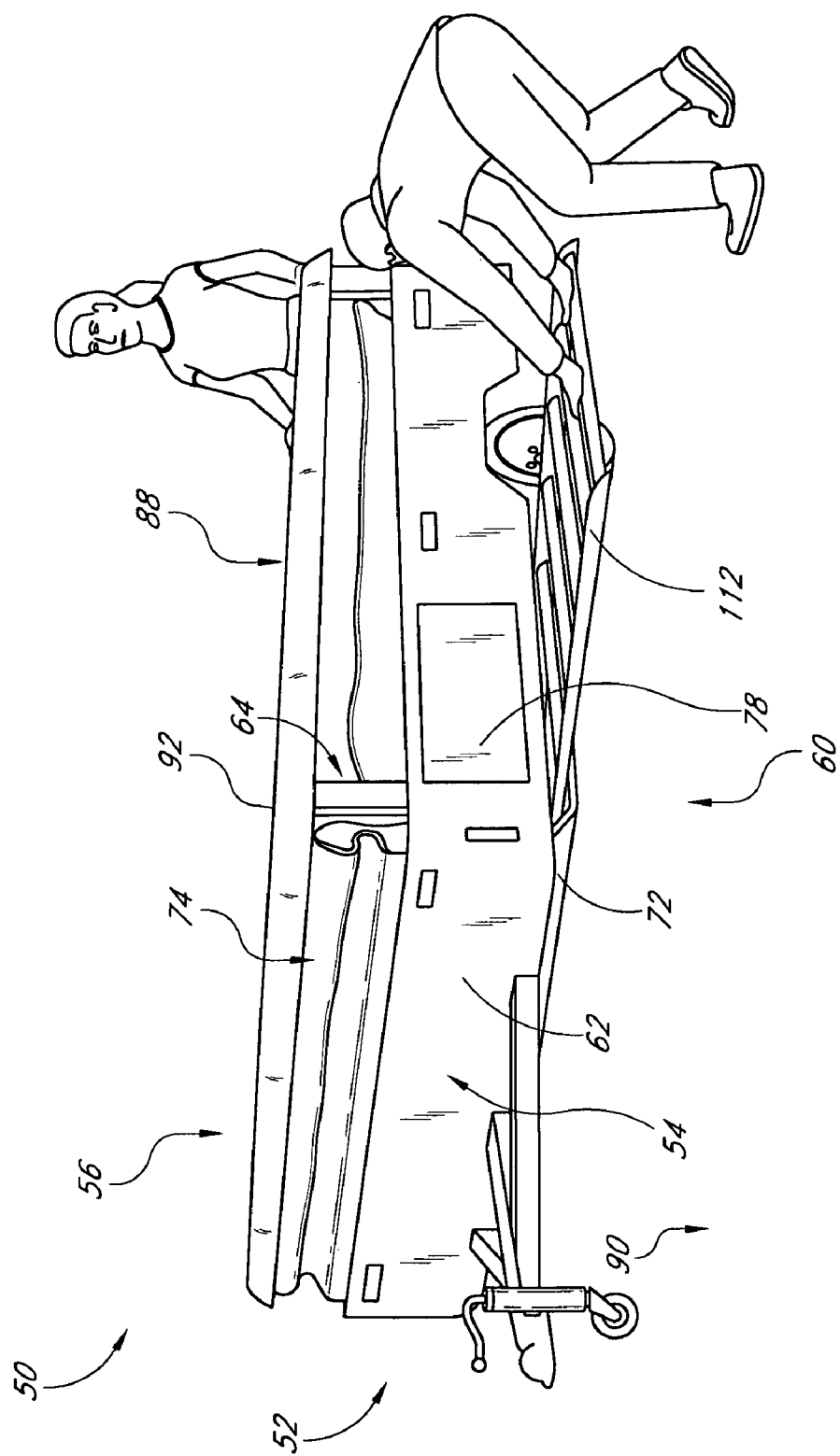
FIG. 4 is a perspective front and side view of the trailer of FIG. 1, showing the trailer cover beginning to be raised from a lowered position to a raised position.
Figure 5:
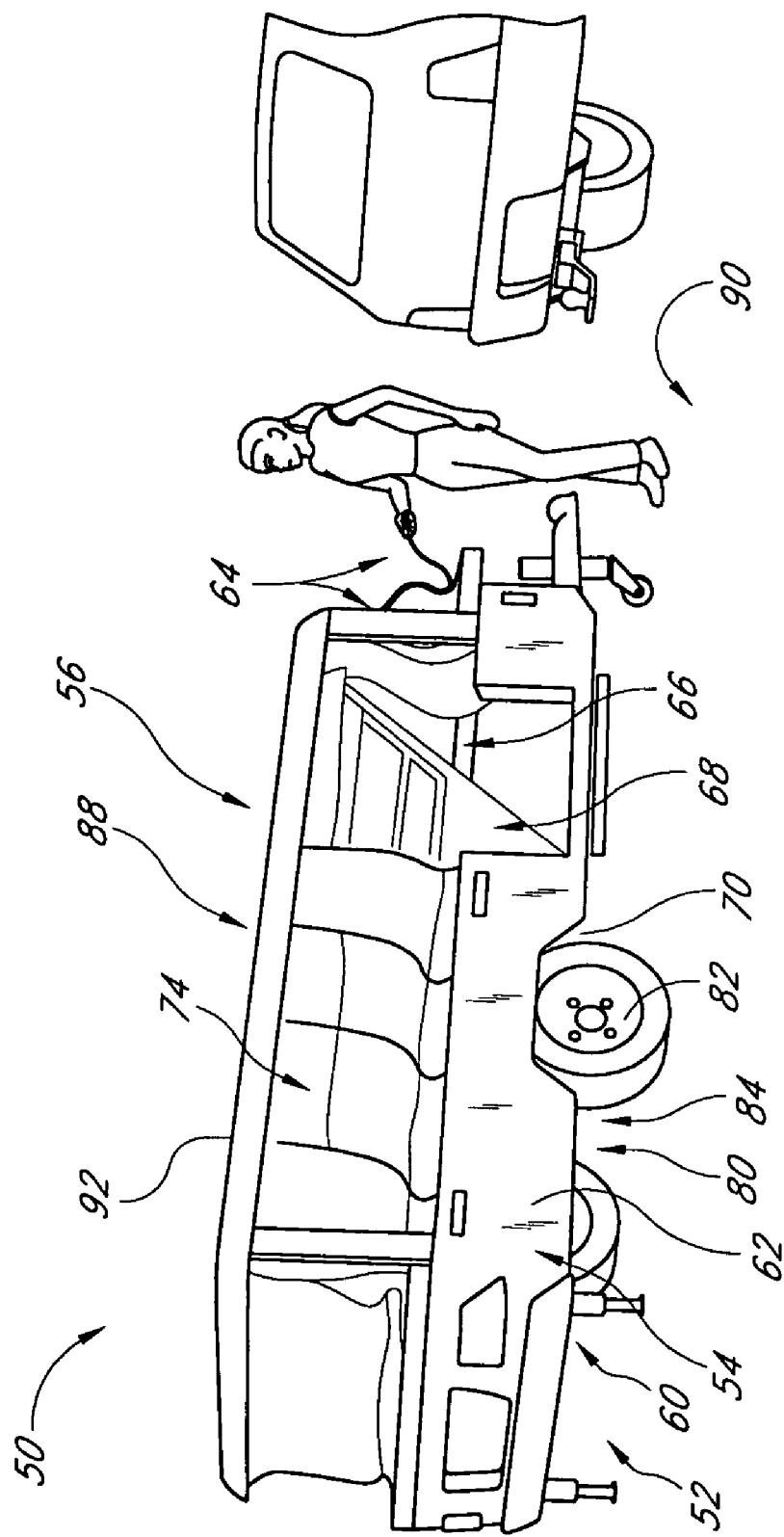
FIG. 5 is a perspective rear and side view of the trailer of FIG. 1, showing the trailer cover being raised from a lowered position to a raised position.
Figure 6:
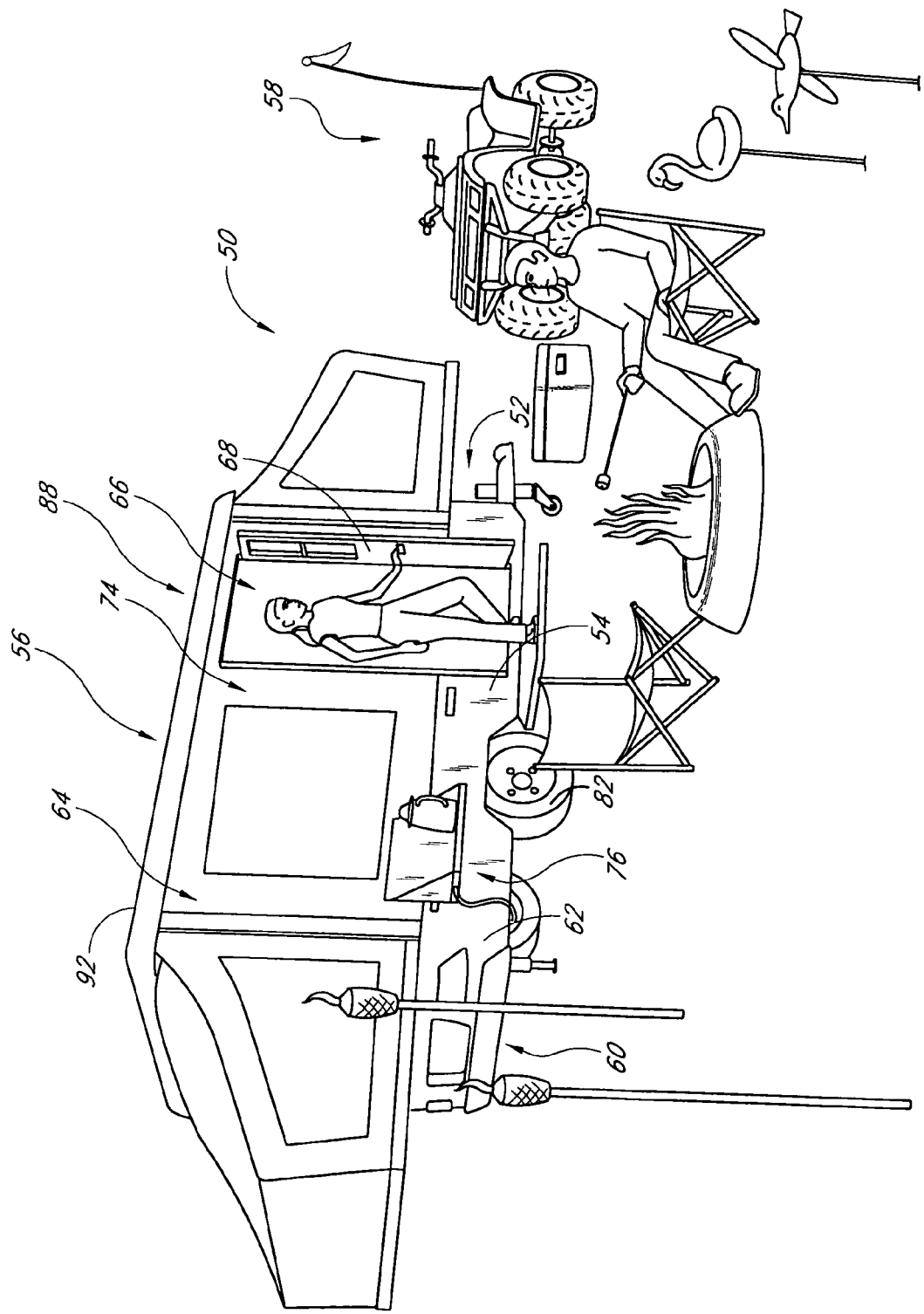
FIG. 6 is a perspective view of the trailer of FIG. 1, showing the trailer cover in a raised position with tent portions deployed.
Figure 14:
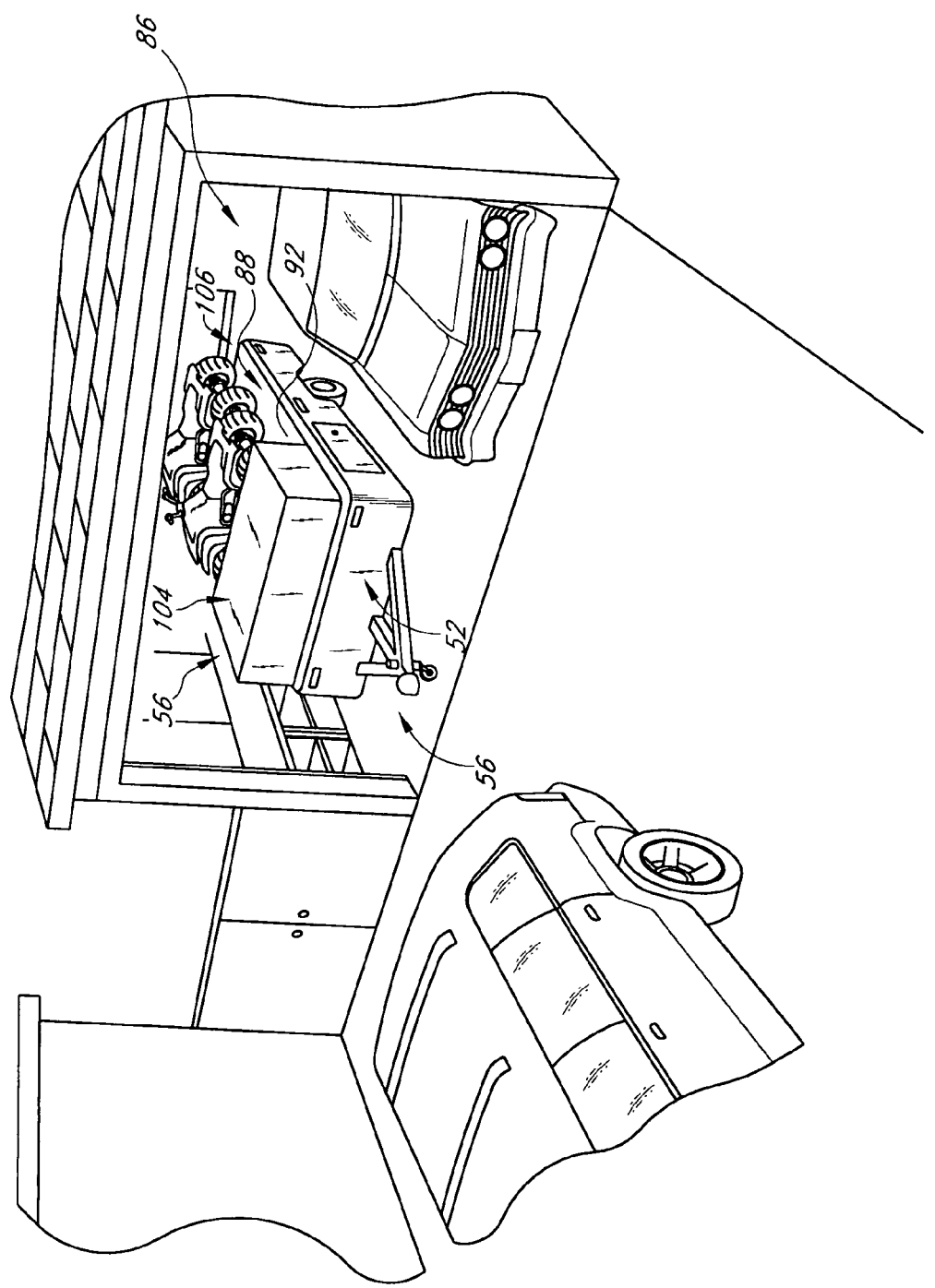
FIG. 14 is a perspective view of the trailer of FIG. 7, showing the trailer positioned within a garage with recreational vehicles mounted thereon.

With reference to FIGS. 4–6, the trailer cover 56 is movable from the first position to the second position. The second position preferably is a raised position. In the second position, the trailer cover 56 is spaced from a top portion of the trailer body 52. The trailer cover 56 preferably is raised using a lift mechanism 64 as will be described further below. The trailer cover 56 forms at least a portion of a roof that is positioned over at least a portion of the habitation space 66.

As shown, for example, in FIGS. 1–3, the trailer cover 56 in the first position preferably is spaced from a base portion 60 of the trailer body 52. Positioning the trailer cover 56 higher than the base portion 60 of the trailer body 52 preferably provides a mechanical advantage useful for raising the trailer cover 56 using a lift mechanism 64 and provides room for habitation structures 68, as will be described further below. The trailer cover 56 in the first position preferably is at least partially supported by the side portions 54 of the trailer body 52. The side portions 54 extend upward from the base portion 60 of the trailer body 52 to support the trailer cover 56.

With reference to FIG. 4, the trailer body 52 preferably comprises a frame 70. The frame 70 is a rigid framework upon which trailer components are positioned. The frame 70 supports the base portion 60 and the side portions 54 of the trailer body 52. The base portion 60 and the side portions 54 of the trailer body 52 support habitation structures 68 and other trailer components as will be described further below. The trailer cover 56 in the first position preferably is at least partially, e.g., indirectly, supported by the frame 70. In one embodiment, the frame 70 indirectly supports the trailer cover 56 through one or more of the side portions 54, one or more interior support struts 72, and/or one or more habitation structures 68.

In some embodiments, the trailer body 52 comprises support struts 72 to at least partially support the trailer cover 56 when it is in the first position. One embodiment having a support strut is illustrated in FIG. 15, which will be described further below. Support struts can be used in connection with other embodiments shown or described herein. The support struts 72 can be any suitable structure for supporting a portion of the trailer cover 56. In some embodiments, the support struts 72 are configured to support a central portion of the trailer cover 56. The support struts 72 preferably are configured such that when the trailer cover 56 is in the second position the support struts 72 tend not to significantly obstruct the use of the habitation space 66. In some embodiments, such as, for example, the embodiment illustrated in FIGS. 7–15, support struts 72 can be movable (e.g., folding to the side or into the base), removable, reconfigurable, or collapsible (e.g., telescoping). With reference to FIG. 15, support struts 72 also can be configured for use with, or as portions of, habitation structures 68. For example, a table has a support strut 72, e.g., a sturdy support tube, that can be mounted in the middle of the floor to at least partially support the trailer cover 56 when it is in the first position. When the trailer cover 56 is moved to the second position, the support strut 72 can be repositioned toward a side portion 54 of the trailer body 52 to support the table for use within the habitation space 66.

With reference to FIGS. 4–6, the trailer 50 comprises a tent portion 74. In some embodiments, the tent portion 74 comprises a fabric, cloth, mesh or other flexible material to generally define at least a portion of a habitation space when placed in an expanded configuration. In some embodiments, the tent portion comprises one or more window features. The tent portion 74 is positioned within the trailer body 52 such that the tent portion 74 is in a collapsed condition when the trailer cover 56 is in the first position. The tent portion 74 preferably is coupled with the trailer body 52 and the trailer cover 56 and is deployable when the trailer cover 56 is in the second position to at least partially define a habitation space 66.

As shown, for example, in the embodiment illustrated in FIGS. 7–15, the trailer body 52 preferably comprises habitation structures 68. With reference to FIG. 15, habitation structures 68 preferably include cabinets or other storage compartments 78, tables, benches, beds, doors, refrigerators, stoves, sinks, restroom facilities, countertops, or other structures suitable for enhancing the habitability of a habitation space 66. The trailer body 52 preferably comprises powered habitation devices 76. Powered habitation devices 76, or other power equipment, can include habitation structures 68 that generate power, that comprise a power source, or that can be coupled to a power source for operation, e.g., a generator, a motor, a refrigerator, a stove, an oven, a water pump, an air compressor, a microwave oven, a television, a radio, a light, a heater, or any other powered amenity, feature or accessory. Habitation structures 68 and/or powered habitation devices 76 can be used in connection with other embodiments shown or described herein. Some features and advantages of configurations having powered habitation devices 76 are described further below.

In some embodiments, the trailer body 52 comprises habitation structures 68 that are convertible from a lowered configuration when the trailer cover 56 is in the first position to a raised configuration when the trailer cover 56 is in the second position. For example, a cabinet can be lowered when the trailer cover 56 is in the first position and the cabinet can be raised for use when the trailer cover 56 forms a portion of the roof of the habitation space 66. In some embodiments, habitation structures 68 are arranged such that the trailer cover 56 in the first position is at least partially supported by one or more habitation structures 68. In some embodiments, habitation structures 68 are fixed in certain positions and designed to support the trailer cover 56 when in the first position. In some embodiments, habitation structures 68 are movable, removable or reconfigurable within the trailer 50 to support the trailer cover 56 in the first position.

The trailer body 52 preferably comprises one or more storage compartments 78. With reference to FIG. 15, as described above, the trailer cover 56 in the first position preferably is at least partially supported by a storage compartment 78, e.g., a cabinet. With reference to FIGS. 18–19, in some embodiments, a storage compartment 78, e.g., a drawer or removable bin, is accessible from outside the trailer body 52 when the trailer cover 56 is in the first position. In some embodiments, the storage compartment 78 is accessible from outside the trailer body 52 when the trailer cover 56 is in the second position. The storage compartment 78 preferably is accessible from inside the habitation space 66 when the trailer cover 56 is in the second position.

With reference to FIGS. 1–6, the trailer body 52 preferably comprises at least one axle 80 and a plurality of wheels 82 for supporting the trailer 50. The axle 80 preferably is sufficiently strong to support the load of the trailer 50 and one or more recreational vehicles 58. In other embodiments, as shown, for example, in FIG. 18, the trailer body 52 comprises a plurality of axles 80. In some embodiments, the trailer body 52 can be axle-less.

With reference to FIG. 2, the trailer body 52 preferably comprises a suspension system 84. The suspension system 84 preferably is adjustable. The suspension system 84 can comprise an adjustable torsion bar or be an adjustable air suspension system. An adjustable suspension system 84 preferably allows the trailer 50 to be raised for travel or lowered for storage. In some embodiments, the stiffness of the air suspension system can be adjusted as desired depending on-the type of terrain to be traversed. With this type of suspension system, the trailer body 52 preferably comprises an air compressor that is used to adjust the air suspension system 84 or for other purposes, such as, filing the tires of the trailer 50, the recreational vehicles 58, and/or the towing vehicle. The user may wish to lower the suspension system 84 to lower the height of the trailer 50 so that it can fit more easily within a storage area, such as for example, a garage, a car port, or other structures, with recreational vehicles 58 mounted on the trailer 50. The user may wish to raise the suspension system 84 upon removing the trailer 50 from the storage area to provide better suspension for travel.

As shown in FIGS. 4–6, the trailer cover 56 preferably is at least partially actuated between the first position and the second position by a lift mechanism 64. The lift mechanism 64 is manually operated in some embodiments. The lift mechanism 64 preferably includes support members in the trailer body 52 that are raised to support the trailer cover 56 in the second position. In some embodiments, the lift mechanism 64 is automated. For this purpose, the trailer body 52 can comprise cylinders coupled to the trailer cover 56 to at least partially actuate the trailer cover 56 between the first position and the second position. In some embodiments, the cylinders are driven by compressed air from the air compressor. The trailer cover 56 can be supported in the second position by the cylinders and/or by braces. In some embodiments, the trailer can comprise any suitable structures for actuating the trailer, such as, for example, one or more structures similar to the structures described in U.S. Pat. No. 5,505,515, issued Apr. 9, 1996 to Turner, entitled FOLDING TRAILER WITH HYDRAULIC LIFT SYSTEM, which is hereby incorporated by reference herein and made a part of this specification.

With reference to FIG. 2, in one embodiment, the trailer cover 56 in the first position is positioned so as to not significantly obstruct a rear view from a vehicle towing the trailer 50. A trailer 50 having a low profile arrangement provides improved visualization out of the rear of a vehicle towing the trailer 50. A low profile arrangement permits a driver of the vehicle to observe traffic as well as determine the security of the recreational vehicles 58 supported on the trailer 50 when in use.

With reference to FIGS. 1–2, in one embodiment, the trailer cover 56 in the first position is configured to support a recreational vehicle 58 while the trailer 50 is moved into or out of a garage 86. In some embodiments, a low profile arrangement allows a user to position and store the trailer 50 within a garage 86 with one or more recreational vehicles 58 supported thereon. In some embodiments, the adjustable suspension system 84 can be raised or lowered to allow the trailer 50 to be positioned within a garage 86 with the recreational vehicles 58 loaded thereon. Storing the recreational vehicles 58 on the trailer 50 in the garage 86 provides for efficient use of limited storage space. Additionally, costs and disadvantages associated with storing the trailer 50 or recreational vehicles off site or outdoors are avoided. The compact storage arrangement reduces the preparation and organization time that is often associated with leaving for, or returning from, a trip.

Figure 22:
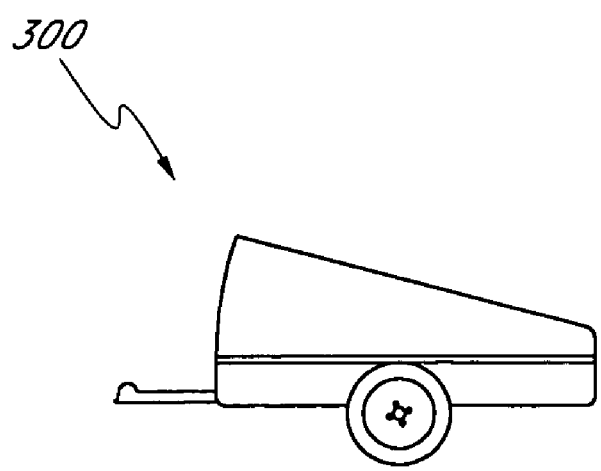
FIG. 22 is a side elevational view of another variation of the trailer of FIG. 1, having an angled trailer cover.

FIG. 22 illustrates a trailer 350 that is a variation of the trailer 50 shown in FIGS. 1–6. Trailer 350 is similar to trailer 50, except as described below. In one embodiment, the trailer 350, as shown in FIG. 22, comprises a trailer cover having one or more slanted surfaces, such that at least a portion of the trailer cover is slanted relative to a ground surface. Where a surface of the trailer cover is slanted relative to the ground surface, a first portion of the surface of the trailer cover can have a first height and a second portion of the surface of the trailer cover can have a second height different from the first height. In some embodiments having at least a partially slanted trailer cover, it can be advantageous to mount one or more recreational vehicles on the slanted trailer cover surface such that relatively taller portions of the recreational vehicles are positioned generally nearer to the lower portions of the slanted trailer cover surface, thereby effectively minimizing or reducing the overall height of the trailer with the recreational vehicles mounted thereon. Additionally, a slanted trailer cover can provide additional space below the trailer cover near the higher portions of the slanted trailer cover surface for housing relatively larger habitation structures 68 or powered habitation devices 76.

In some embodiments, a height at a lower portion of the slanted trailer cover in the first position preferably is between about three feet (91.4 cm) and about four feet (121.9 cm) relative to a ground surface supporting the trailer. The height at the lower portion of the slanted trailer cover can be less than about 4 feet (121.9 cm) in some embodiments. In other embodiments, the height at the lower portion of the slanted trailer cover is less than about 3 feet, six inches (106.7 cm). The height at the lower portion of the slanted trailer cover is less than about 3 feet, four inches (101.6 cm) in some embodiments. The trailer cover in the first position preferably is configured to support a recreational vehicle 58 such that a combined height of the recreational vehicle 58 in a supported position on the trailer is between about 6 feet (182.9 cm) and about 8 feet (243.8 cm) relative to the ground surface supporting the trailer. In some embodiments, the combined height of the recreational vehicle 58 in a supported position on the trailer is less than about 8 feet (243.8 cm). The combined height of the recreational vehicle 58 in a supported position on the trailer is less than about 7 feet, six inches (228.6 cm) in some embodiments. In other embodiments, the combined height of the recreational vehicle 58 in a supported position on the trailer preferably is less than about 7 feet (213.4 cm).

In another embodiment, as shown in FIGS. 7–15, a trailer cover has a plurality of surfaces. The surfaces can be positioned at different heights relative to a ground surface. In some embodiments, the height of the trailer cover advantageously allows recreational vehicles to be stored thereon within a confined area, such as for example, within a garage.

With reference to FIGS. 7–15, the trailer cover 56 comprises a vehicle support surface 88. The height of the vehicle support surface 88 preferably is between about three feet (91.4 cm) and about four feet (121.9 cm) relative to a ground surface 90 supporting the trailer 50. The height of the vehicle support surface 88 can be less than about 4 feet (121.9 cm) in some embodiments. In other embodiments, the height of the vehicle support surface 88 is less than about 3 feet, six inches (106.7 cm). The height of the vehicle support surface 88 preferably is less than about 3 feet, four inches (101.6 cm) in some embodiments.

In one embodiment, the trailer 50 comprises a trailer body 52 having a plurality of side walls 62 and one or more wheels 82; in the illustrated embodiment, the trailer has two wheels 82. The trailer 50 comprises a platform 92 for supporting a recreational vehicle 58. The platform 92 has a lowered configuration and a raised configuration relative to the trailer body 52. The platform 92 in the lowered configuration is at least partially supported on at least one of the side walls 62. The platform 92 in the lowered configuration has a first height, relative to the bottoms of the wheels 82, of not greater than about three feet, four inches (101.6 cm). The platform 92 is so dimensioned that a distance from a bottom of the wheel 82 to a top of a recreational vehicle 58, when loaded on the platform 92, is such that the trailer 50 will fit within a garage 86 with the recreational vehicle 58 loaded thereon, as shown, for example, in FIG. 14. The platform 92 in the raised configuration has a second height, relative to the bottoms of the wheels 82, sufficient to at least partially define a habitation space 66 below the platform 92. The platform 92 forms at least a portion of a roof in the raised configuration, as shown, for example in FIGS. 11 and 12.

With continued reference to FIGS. 7–15, the trailer cover 56 in the first position preferably is configured to support a recreational vehicle 58 such that a combined height of the recreational vehicle 58 in a supported position on the trailer 50 is between about 6 feet (182.9 cm) and about 8 feet (243.8 cm) relative to the ground surface 90 supporting the trailer 50. In some embodiments, the combined height of the recreational vehicle 58 in a supported position on the trailer 50 is less than about 8 feet (243.8 cm). The combined height of the recreational vehicle 58 in a supported position on the trailer 50 is less than about 7 feet, six inches (228.6 cm) in some embodiments. In other embodiments, the combined height of the recreational vehicle 58 in a supported position on the trailer 50 preferably is less than about 7 feet (213.4 cm).

As shown in FIGS. 7–10, the trailer cover 56 preferably seals over the trailer body 52 in the first position. Sealing the trailer cover 56 over the trailer body 52 preferably protects the tent portion 74, habitation structures 68, and other components and systems housed within the trailer 50 from exposure to the elements.

With reference to FIGS. 11 and 12, in one embodiment, the trailer cover 56 in the second position is configured to function as a raised patio or platform. The support structure for the trailer cover 56 and the lift mechanism 64 preferably are sufficiently strong that users can climb atop the trailer cover 56 when it is in a raised position and forms at least a portion of the roof above the habitation space 66. In some embodiments, a ladder is provided for accessing the rooftop patio or platform.

The trailer 50 preferably comprises one or more vehicle securement members 94. Vehicle securement members 94 preferably secure a recreational vehicle 58 to the trailer 50.

Vehicle securement members 94 preferably are configurable and may include wheel chocks 96, rails 98, tie down anchors 100, and locks 102. As shown in FIGS. 8 and 9, wheel chocks 96 are placed on the vehicle support surface 88 to minimize the risk that the wheels of a recreational vehicle 58 will roll or slide while being towed, moved, or stored. As shown in FIG. 18, one or more rails 98 and/or other stops, e.g., wheel chocks, are positioned on the vehicle support surface 88, preferably near the side edges of the vehicle support surface 88 to maintain the recreational vehicle 58 atop the support surface. As shown in FIGS. 8–10, tie down anchors 100 are placed over portions of the recreational vehicles 58 and coupled with the trailer body 52 or trailer cover 56. With reference to FIG. 18, locks 102 can be provided to secure the recreational vehicle 58 to the trailer 50 for security purposes. Vehicle securement members 94 preferably are adjustable and positionable in various configurations on the trailer cover 56 or body to accommodate a desired number of recreational vehicles 58 mounted on the trailer 50. The vehicle securement members 94 can be configured to secure different types of recreational vehicles 58 or other cargo.

With reference to FIGS. 7–15, the trailer cover 56 has a first section 104 and a second section 106. As shown, the first section 104 is a front section and the second section 106 is a rear section. The first section 104 preferably is higher than the second section 106 relative to the ground surface 90 supporting the trailer 50 when the trailer cover 56 is in the first position. Recreational vehicles 58 preferably are positioned on the second section 106. In some embodiments, the first section 104 forms an elevated mounting surface to support relatively lighter cargo or gear in a position generally above the surface where the recreational vehicles 58 are mounted. The first section 104 can support or comprise one or more roof-mounted devices 108, e.g., a vent, a fan, an air conditioning unit, an antenna, or other devices preferably mounted in an elevated position, as is illustrated in connection with the embodiment shown in FIGS. 18–19. Positioning the roof-mounted devices 108 on the first section 104 preferably protects them from damage by the recreational vehicles 58. Additionally, the roof-mounted devices 108 preferably are protected from dirt, mud, grease, oil, gasoline, water, or other contaminants associated with the recreational vehicles 58. The first section 104 comprises molded wheel chocks in some embodiments.

The first and second sections 104, 106 are formed integrally as a unitary roof structure in some embodiments, as is illustrated in the embodiments shown in FIGS. 7–15 and FIGS. 16–17. With reference to FIGS. 7–15, the raised portion of a unitary roof structure acts to enhance the structural integrity of the trailer cover 56. In other embodiments, such as for example, the embodiment illustrated in FIGS. 18–19, the first and second sections 104, 106 are not formed integrally as a unitary roof structure.

As shown in FIGS. 7–15, 16–17, and 18–19, relatively larger habitation structures 68 or powered habitation devices 76, e.g., a refrigerator, a stove, a water pump, a restroom facility, or other relatively large components, preferably are accommodated generally below the first section 104 of the trailer cover 56. In the embodiment shown in FIGS. 7–15, the side portions 54 of the trailer body 52 have a generally uniform height and the first section 104 of the trailer cover 56 has extended side portions 110 to enclose or cover the habitation structures 68. In another embodiment, shown in FIGS. 16–17, the side portions 54 of the trailer body 52 disposed below the first section 104 of the trailer cover 56 are extended higher than the side portions 54 of the trailer body 52 disposed below the second section 106 of the trailer cover 56. In one embodiment, the first and second sections 104, 106 of the trailer cover 56 preferably are contoured to generally correspond to the shape of the top of the side portions 54 of the trailer body 52 to enclose or cover the habitation structures 68.

FIGS. 7–15, 16–17, and 18–19, illustrate embodiments wherein the first section 104 is movable between a first height (e.g., a lowered position) and a second height (e.g., a raised position). The first section 104 is movable independent of the second section 106 in some embodiments, such as, for example, in the embodiment shown in FIGS. 18–19. In FIGS. 7–15, 16–17, and 18–19, the second section 106 is movable between a first height (e.g., a lowered position) and a second height (e.g., a raised position). The second section 106 is movable independent of the first section 104 in some embodiments, such as, for example, in the embodiment shown in FIGS. 18–19. In some embodiments, the first and second sections 104, 106 are formed integrally, or can be coupled to move together, as described above and illustrated in the embodiments shown in FIGS. 7–15, and 16–17. As shown in FIGS. 18–19, in some embodiments, the second section 106 is configured to move a first distance independently, and then to move a second distance coupled to the first section 104. For example, the second section 106 can be raised independently to engage the first section 104, and then both sections can be raised together.

As shown in FIG. 3, the trailer 50 preferably comprises a ramp 112 configured to be coupled to the trailer body 52. In some embodiments, the ramp 112 hangs from the frame 70 below the base portion 60 of the trailer body 52. The ramp 112 is used to load the recreational vehicles 58 on top of the trailer cover 56 while in the first position. In some embodiments, the ramp 112 is also configured to function as a habitation structure 68, such as, for example, a door, a table, or a bed support.

Figure 20:
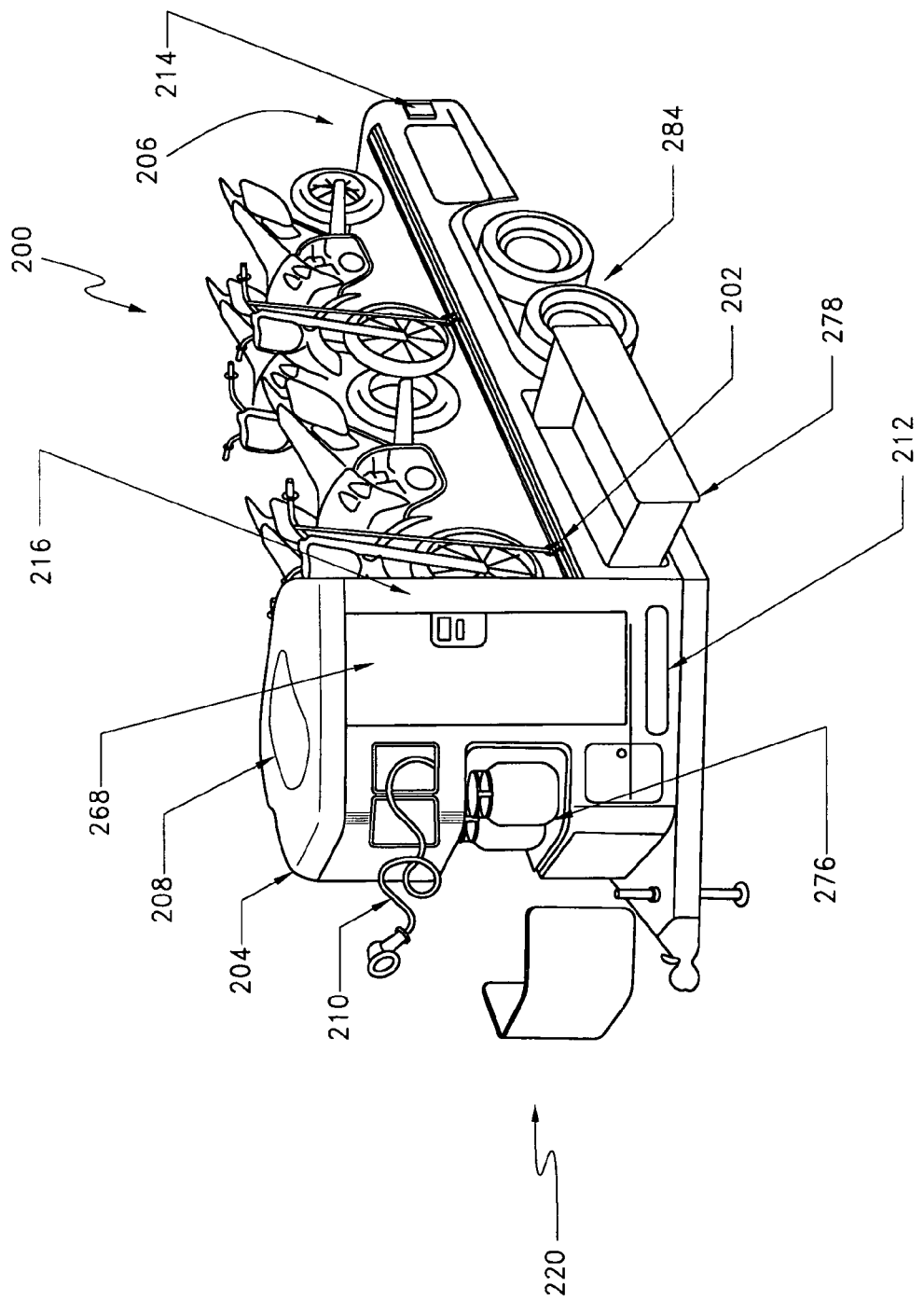
FIG. 20 is a perspective view of another embodiment of a trailer having a raised front portion.

FIG. 20 is a perspective view of another embodiment of a trailer 200 having a raised front portion 220. The trailer of FIG. 20 is similar to the trailer of FIGS. 18–19, except as described below. As shown in FIG. 20, the front portion 220 of the trailer 200 can be taller than the front portion of the trailer of FIGS. 18–19. In some embodiments, it is desirable to provide a taller front portion 220 of the trailer 200 to provide space for larger components and/or to provide additional storage space. For example, relatively larger habitation structures or powered habitation devices, e.g., a refrigerator, a stove, a water pump, a restroom facility, or other relatively large components may be configured in the taller front portion 220 of the trailer 200. Additionally, the front portion 220 of the trailer 200 can provide some protection for the vehicles stored on the trailer 200 as the trailer 200 is being towed behind a vehicle. In the illustrated embodiment, the trailer 200 also comprises an aircraft style head 216, a folding door 268, a pop-up HVAC unit 208, a pop-up roof 204, 206, a shower portion 210, an enclosed fuel storage portion 276, e.g., propane storage portion, a pull-out step 212, a pull-out cargo storage drawer 278, adjustable tie down points 202, a heavy duty dual axel 284, and an AC hook up 214. The trailer 200 can additionally comprise any one or more of the other features and components described herein. In some embodiments, one or more of the components described herein with reference to trailer 200 can be modified, substituted or removed.

Figure 21:
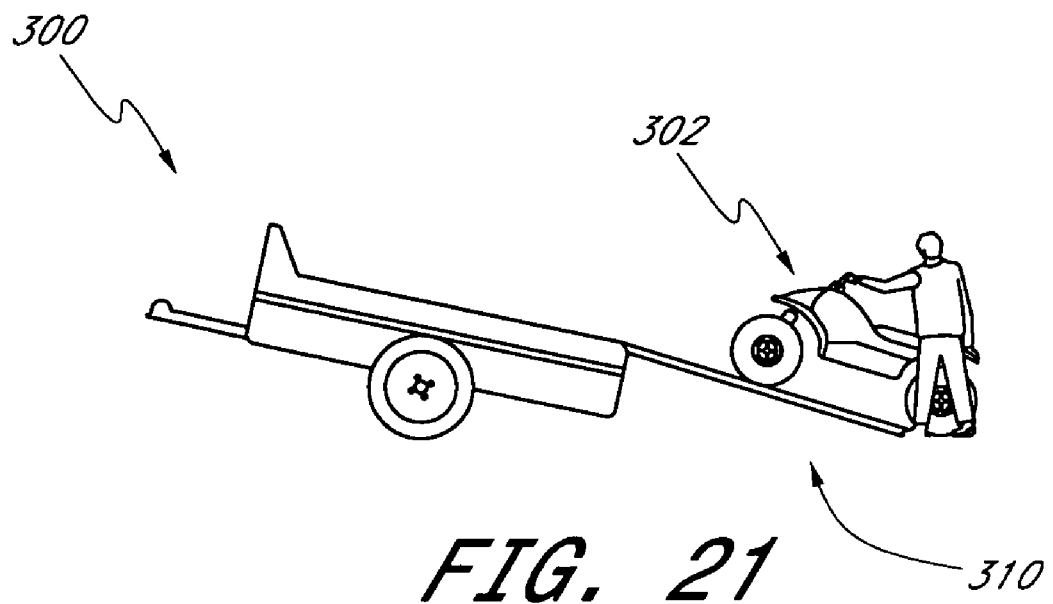
FIG. 21 is a side elevational view of a variation of the trailer of FIG. 1, showing a recreational vehicle being loaded onto or removed from the trailer.

FIG. 21 illustrates a trailer 300 that is a variation of the embodiment of trailer 50 shown in FIGS. 1–6. The trailer 300 is similar to the trailer 50, except as described below. In FIG. 21, a recreational vehicle 302 is shown being positioned on, or removed from, the trailer 300 using a ramp 310 positioned at a rear portion of the trailer. In some embodiments, the trailer 300 can be tilted while moving the recreational vehicle 302 onto or off of the trailer 300.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In particular, while the present trailer 50 has been described in the context of particularly preferred embodiments, the skilled artisan will appreciate, in view of the present disclosure, that certain advantages, features and aspects of the trailer may be realized in a variety of other applications, many of which have been noted above. The skilled artisan can readily adapt the principles and advantages described herein to a variety of other applications. Additionally, it is contemplated that various aspects and features of the invention described can be practiced separately, combined together, or substituted for one another, and that a variety of combination and subcombinations of the features and aspects can be made and still fall within the scope of the invention. Thus, it is intended that the scope of the present invention herein disclosed should not be limited by the particular disclosed embodiments described above, but should be determined only by a fair reading of the claims that follow.

What is claimed is:

1. A trailer comprising:
   a trailer body having a side portion; and
   a trailer cover coupled to the trailer body, and movable between a first position and a second position relative to the trailer body, the trailer cover at least in the first position being sufficiently rigid to support a recreational vehicle above the side portion of the trailer body, and the trailer cover forming at least a portion of a roof in the second position and being spaced from the trailer body a sufficient distance to at least partially define a habitation space below the trailer cover.

2. The trailer of claim 1, wherein the trailer cover is spaced from a base of the trailer body.

3. The trailer of claim 1, wherein the trailer cover in the first position is at least partially supported by the side portion.

4. The trailer of claim 1, wherein the trailer body comprises a habitation structure and the trailer cover in the first position is at least partially supported by the habitation structure.

5. The trailer of claim 1, wherein the trailer cover in the first position is configured to not obstruct a view from a vehicle towing the trailer.

6. The trailer of claim 1, wherein the trailer cover in the first position is configured to support a recreational vehicle while the trailer is moved into or out of a garage.

7. The trailer of claim 1, wherein the trailer cover comprises a vehicle support surface.

8. The trailer of claim 7, wherein a height of the vehicle support surface is less than about 4 feet relative to a ground surface supporting the trailer.

9. The trailer of claim 1, wherein the trailer cover in the first position is configured to support a recreational vehicle such that a combined height of the recreational vehicle in a supported position on the trailer is less than about 8 feet relative to a ground surface supporting the trailer.

10. The trailer of claim 9, wherein the trailer cover in the first position is configured to support a recreational vehicle such that a combined height of the recreational vehicle in a supported position on the trailer is less than about 7 feet, six inches relative to the ground surface supporting the trailer.

11. The trailer of claim 1, wherein the trailer body comprises a suspension system.

12. The trailer of claim 11, wherein the suspension system is adjustable.

13. The trailer of claim 1, wherein the trailer body comprises cylinders coupled to the trailer cover and the trailer cover in the second position is at least partially supported by the cylinders.

14. The trailer of claim 13, wherein the trailer cover is at least partially actuated between the first position and the second position by the cylinders.

15. The trailer of claim 1, wherein the trailer cover is at least partially actuated between the first position and the second position by a lift mechanism.

16. The trailer of claim 15, wherein the lift mechanism is automated.

17. The trailer of claim 1, further comprising a tent portion.

18. The trailer of claim 1, wherein the trailer cover seals over the trailer body in the first position.

19. A trailer comprising:
   a trailer body comprising at least one powered habitation device; and
   a trailer cover coupled to the trailer body, and movable between a first position and a second position relative to the trailer body, at least a portion of the trailer cover in the first position being sufficiently rigid to support a recreational vehicle, and at least a portion of the trailer cover in the first position being disposed generally above the powered habitation device.

20. A trailer comprising:
   a trailer body having a plurality of side walls and at least one wheel, and
   a trailer cover for supporting one or more recreational vehicles, the trailer cover having a lowered configuration and a raised configuration relative to the trailer body, the trailer cover in the lowered configuration being at least partially slanted and supported on at least one of the side walls, the trailer cover in the lowered configuration having a lower portion with a height, relative to a bottom of the wheel, of not greater than about three feet, four inches, and the trailer cover in the raised configuration forming at least a portion of a roof having a height, relative to the bottom of the wheel, sufficient to at least partially define a habitation space below the platform.

* * * * *